(12) United States Patent
Lim (10) Patent No.: US 12,541,633 B2
(45) Date of Patent: Feb. 3, 2026

(54) MACHINE LEARNING BASED AUTOMATIC ROUTING METHOD AND APPARATUS FOR SEMICONDUCTOR EQUIPMENT

(71) Applicant: RC-Tech Co.,Ltd., Yongin-si (KR)

(72) Inventor: Tae hwa Lim, Yongin-si (KR)

(73) Assignee: RC-Tech Co., Ltd., Yongin-si (KR)

( * ) Notice: Subject to any disclaimer, the term of this patent is extended or adjusted under 35 U.S.C. 154(b) by 778 days.

(21) Appl. No.: 17/806,702

(22) Filed: Jun. 13, 2022

(65) Prior Publication Data

US 2022/0398371 A1    Dec. 15, 2022

(30) Foreign Application Priority Data

Jun. 11, 2021   (KR) .................. 10-2021-0076147

(51) Int. Cl.
*G06F 30/394*   (2020.01)
*G06F 30/392*   (2020.01)
*G06N 20/00*   (2019.01)

(52) U.S. Cl.
CPC .......... *G06F 30/394* (2020.01); *G06F 30/392* (2020.01); *G06N 20/00* (2019.01)

(58) Field of Classification Search
CPC .. G06F 30/394; G06F 30/392; G06F 2111/06; G06F 30/27; G06F 30/398; G06N 20/00; G06N 3/08
See application file for complete search history.

(56) References Cited

U.S. PATENT DOCUMENTS

| | | | | |
|---|---|---|---|---|
| 10,186,027 B1* | 1/2019 | Hicken | ...................... | G06T 7/60 |
| 10,809,080 B2* | 10/2020 | Zhang | ............... | G06F 18/24143 |
| 11,606,285 B2* | 3/2023 | McCormick | .......... | H04L 45/122 |
| 11,748,547 B2* | 9/2023 | Zanarini | ............... | G06F 30/398 |
| | | | | 716/112 |
| 2005/0065630 A1* | 3/2005 | Funk | .................. | G05B 19/4187 |
| | | | | 700/121 |
| 2005/0171627 A1* | 8/2005 | Funk | ................. | H01L 21/67253 |
| | | | | 700/121 |
| 2006/0259173 A1* | 11/2006 | Chin | ................ | G05B 19/41865 |
| | | | | 700/99 |

(Continued)

FOREIGN PATENT DOCUMENTS

JP       5149855 B2    12/2012
JP    2014-35761 A     2/2014

(Continued)

*Primary Examiner* — Nha T Nguyen
(74) *Attorney, Agent, or Firm* — BROADVIEW IP LAW, PC (57) ABSTRACT

The present disclosure relates to a machine learning-based automatic routing method and apparatus for semiconductor equipment, and the machine learning-based automatic routing method for semiconductor equipment according to one embodiment of the present disclosure includes: a first operation of disposing semiconductor equipment and ancillary equipment; a second operation of recognizing connection points (points of connection, POC) which are three-dimensional (3D) coordinates of the semiconductor equipment and the ancillary equipment; and a third operation of generating an optimal path which connects the connection points (POC) using a machine learning algorithm.

7 Claims, 5 Drawing Sheets

(56) References Cited

U.S. PATENT DOCUMENTS

| | | | | |
|---|---|---|---|---|
| 2008/0163094 A1* | 7/2008 | Pannese | ................ | G06F 16/248 |
| | | | | 715/772 |
| 2010/0064969 A1* | 3/2010 | Hiraiwa | ............ | H01L 21/67276 |
| | | | | 257/E21.482 |
| 2018/0283486 A1* | 10/2018 | Kim-Whitty | ....... | H01L 21/6719 |
| 2019/0182124 A1* | 6/2019 | Jeuk | ........................ | H04L 45/02 |
| 2019/0392088 A1* | 12/2019 | Duff | .................. | G02B 27/0172 |
| 2020/0401118 A1* | 12/2020 | Shi | .................. | G05B 19/41865 |
| 2022/0244716 A1* | 8/2022 | Medvedev | ......... | G05B 23/0275 |
| 2024/0378347 A1* | 11/2024 | Roham | .................. | G06F 30/17 |

FOREIGN PATENT DOCUMENTS

| | | |
|---|---|---|
| JP | 2019-512802 A | 5/2019 |
| JP | 2020-149235 A | 9/2020 |
| KR | 10-1124020 B1 | 4/2012 |
| KR | 10-2012-0112957 A | 10/2012 |
| KR | 10-2013-0082947 A | 7/2013 |
| KR | 10-2015-0056700 A | 5/2015 |
| KR | 10-2018-0081375 A | 7/2018 |
| KR | 10-1989314 B1 | 6/2019 |
| KR | 10-2158077 B1 | 9/2020 |
| KR | 10-2183830 B1 | 11/2020 |
| KR | 10-2185433 B1 | 12/2020 |
| KR | 10-2236536 B1 | 4/2021 |

\* cited by examiner

MACHINE LEARNING BASED AUTOMATIC ROUTING METHOD AND APPARATUS FOR SEMICONDUCTOR EQUIPMENT

CROSS-REFERENCE TO RELATED APPLICATION

This application claims priority under 35 U.S.C § 119 to Korean Patent Application No. 10-2021-0076147 filed in the Korean Intellectual Property Office on Jun. 11, 2021, the entire contents of which are hereby incorporated by reference.

FIELD OF THE INVENTION

The present disclosure relates to a machine learning-based automatic routing method and apparatus for semiconductor equipment, and more specifically, to a machine learning-based automatic routing method and apparatus for semiconductor equipment capable of reducing building costs and construction time.

DISCUSSION OF RELATED ART

Generally, manufacturing plants progress by five common steps of planning, design, construction, hook-up, and operation. Currently, an investment scale calculation method based on a manual two-dimensional (2D) drawing is used. In order to build a semiconductor manufacturing plant which costs trillions of won, numerous stakeholders such as plumbers and the like directly make sketches on site.

Generally, a semiconductor manufacturing plant may include manufacturing equipment and utilities necessary for operating the equipment. The utilities may include various pipes, lines, wiring, facilities, and the like for providing electricity, gas, water, chemicals, and the like. The pipes, lines, wiring, and the like can be intensively installed in a limited space.

Since each person involved generates a 2D drawing according to their field, an integrated design and review by application of rules suitable for the characteristics of the manufacturing industry has not been performed, and since there are thousands to tens of thousands of instances of pipe design interference and conflict, reconstruction costs increase.

Accordingly, since pipe design and modification work periods are prolonged, and it is impossible to calculate a total amount of raw materials to be used, a length is not calculated in advance, and numerous materials such as wiring, pipes, and the like are cut and discarded on site.

Accordingly, there is a need for an optimized semiconductor manufacturing plant design means capable of reducing building costs and construction time through collection, analysis and processing of retained and necessary data.

SUMMARY OF THE INVENTION

The present disclosure has been devised to solve the above-described problems, and a machine learning-based automatic routing method and apparatus for semiconductor equipment according to the present disclosure define three-dimensional (3D) connection points (points of connection, POC) between semiconductor equipment and ancillary equipment, and connect the semiconductor equipment and the ancillary equipment based on a machine learning algorithm using this data to reduce the costs of building materials and significantly shorten a building construction time by accurately calculating the lengths of materials such as wiring, pipes, and the like.

A machine learning-based automatic routing method for semiconductor equipment using a machine learning-based automatic routing apparatus for semiconductor equipment according to one embodiment of the present disclosure includes: a first operation of disposing semiconductor equipment and ancillary equipment; a second operation of recognizing connection points (POC) which are 3D coordinates of the semiconductor equipment and the ancillary equipment; and a third operation of generating an optimal path which connects the connection points (POC) using a machine learning algorithm.

According to another embodiment of the present disclosure, connection points of an input and an output of the semiconductor equipment and the ancillary equipment may be recognized in the second operation.

According to another embodiment of the present disclosure, an optimal path which connects the connection points (POC) based on the semiconductor equipment using the machine learning algorithm may be generated in the third operation.

According to another embodiment of the present disclosure, an optimal path which connects the connection points (POC) based on the semiconductor equipment using a Dijkstra algorithm may be generated in the third operation.

According to another embodiment of the present disclosure, the semiconductor equipment and the ancillary equipment may be respectively disposed on floors in the first operation, the connection points (POC) which are the 3D coordinates of the semiconductor equipment and the ancillary equipment respectively disposed on the floors may be recognized in the second operation, and the optimal path which connects the connection points (POC) which are the 3D coordinates of the semiconductor equipment and the ancillary equipment respectively disposed at the sides using the machine learning algorithm may be generated in the third operation.

According to another embodiment of the present disclosure, the optimal path may be generated while maintaining a correlation between the connection points (POC) which are the 3D coordinates of the semiconductor equipment and the ancillary equipment respectively disposed at the sides using the machine learning algorithm when the semiconductor equipment and the ancillary equipment are moved in the third operation.

A machine learning-based automatic routing apparatus for semiconductor equipment according to one embodiment of the present disclosure includes: an equipment module disposition unit configured to dispose semiconductor equipment and ancillary equipment; a connection point recognition unit configured to recognize connection points (POC) which are 3D coordinates of the semiconductor equipment and the ancillary equipment; and an optimal path generation unit configured to generate an optimal path which connects the connection points (POC) using a machine learning algorithm.

According to another embodiment of the present disclosure, the connection point recognition unit may recognize connection points of an input and an output of the semiconductor equipment and the ancillary equipment.

According to another embodiment of the present disclosure, the optimal path generation unit may generate an optimal path which connects the connection points (POC) based on the semiconductor equipment using the machine learning algorithm.

According to another embodiment of the present disclosure, the optimal path generation unit may generate an optimal path which connects the connection points (POC) based on the semiconductor equipment using a Dijkstra algorithm.

According to another embodiment of the present disclosure, the equipment module disposition unit may respectively dispose the semiconductor equipment and the ancillary equipment on floors, the connection point recognition unit may recognize the connection points (POC) which are the 3D coordinates of the semiconductor equipment and the ancillary equipment respectively disposed on the floors, and the optimal path generation unit may generate the optimal path which connects the connection points (POC) which are the 3D coordinates of the semiconductor equipment and the ancillary equipment respectively disposed at the sides using the machine learning algorithm.

According to another embodiment of the present disclosure, the optimal path generation unit may generate an optimal path by maintaining a correlation between the connection points (POC) which are the 3D coordinates of the semiconductor equipment and the ancillary equipment respectively disposed at the sides using the machine learning algorithm when the semiconductor equipment and the ancillary equipment are moved.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Terms used in the specification will be briefly described, and the present disclosure will be described in detail.

Currently and widely used general terms are selected as terms used in embodiments of the present disclosure as much as possible while considering the functions in the present disclosure, but may be changed according to the intention or precedent of those skilled in the art, the emergence of a new technology, and the like. Further, a specific case may also include terms arbitrarily selected by the applicant, and in this case, meanings will be described in detail in a description of the disclosure. Accordingly, the terms used in the present disclosure should be defined based on the meanings of the terms and the contents of the present disclosure, not the simple names of the terms.

Since the embodiments of the present disclosure may be variously changed and have various embodiments, specific embodiments will be exemplified in the drawings and described in the detailed description in detail. However, it should be understood that this is not intended to limit the scope to the specific embodiments, and includes all changes, equivalents, and substitutes included in the spirit and scope of the present disclosure. In the description of the embodiments disclosed in the specification, when it is determined that the detailed description of a related known technology may obscure the subject matter, the detailed description thereof will be omitted Terms such as first, second, and the like may be used to describe various components, but the components should not be limited by the above terms. The above terms are used only for the purpose of distinguishing one component from another.

A singular form also includes a plural form, unless the context clearly indicates otherwise. In the present application, it should be further understood that the terms "include," "including," "composed of" designate the presence of stated features, integers, steps, operations, elements, components, and/or a combination thereof, but do not preclude the presence or addition of one or more other features, integers, steps, operations, elements, components, and/or a combination thereof.

Embodiments of the present disclosure will be described below in detail with reference to the accompanying drawings which may allow one of ordinary skill in the art to easily carry out the present disclosure. However, the present disclosure may be implemented in various forms and is not limited to the following embodiments. Further, parts not related to the description are not included in the drawings to clearly describe the present disclosure, and similar drawing numerals are assigned to the same or similar parts throughout the specification.

Figure 1:
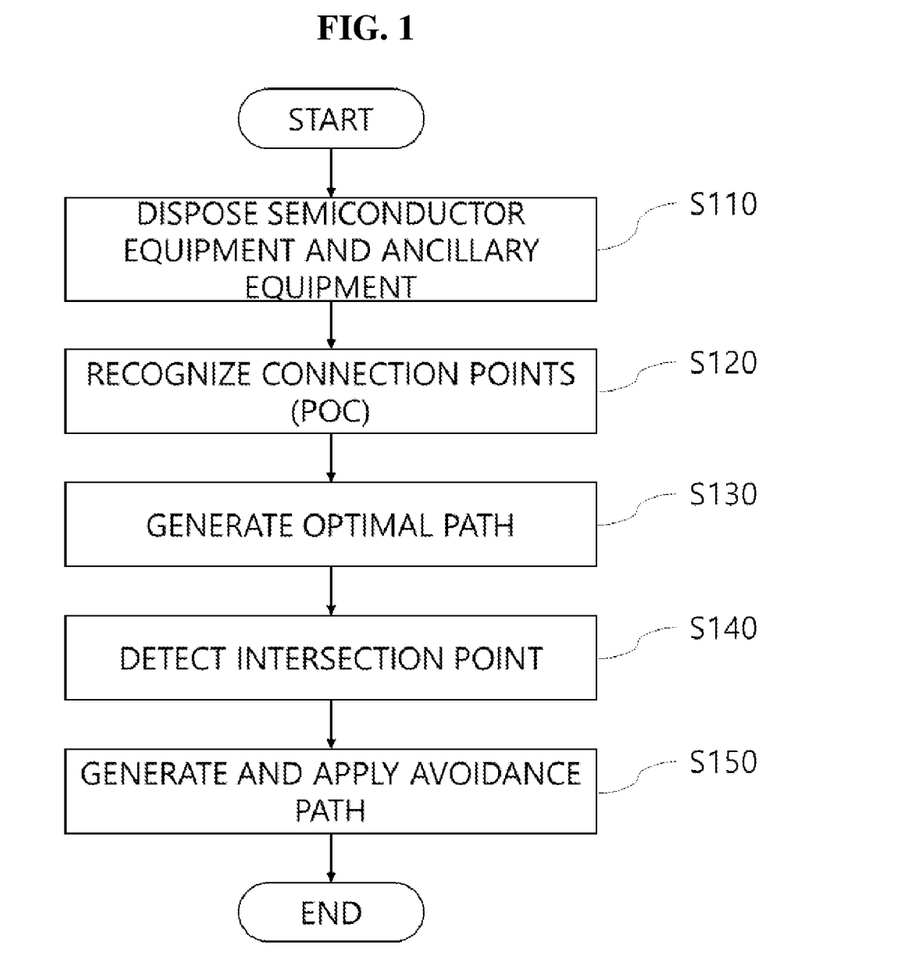
FIG. 1 is a flow chart for describing a machine learning-based automatic routing method for semiconductor equipment according to one embodiment of the present disclosure.
Figure 2:
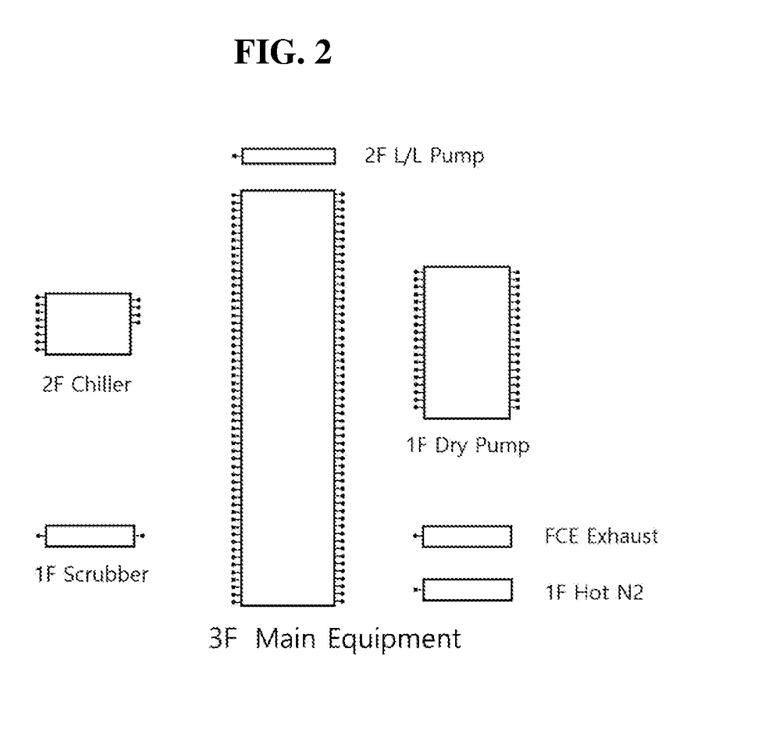
FIGS. 2 to 4 are views for describing the machine learning-based automatic routing method for semiconductor equipment according to one embodiment of the present disclosure.
Figure 3:
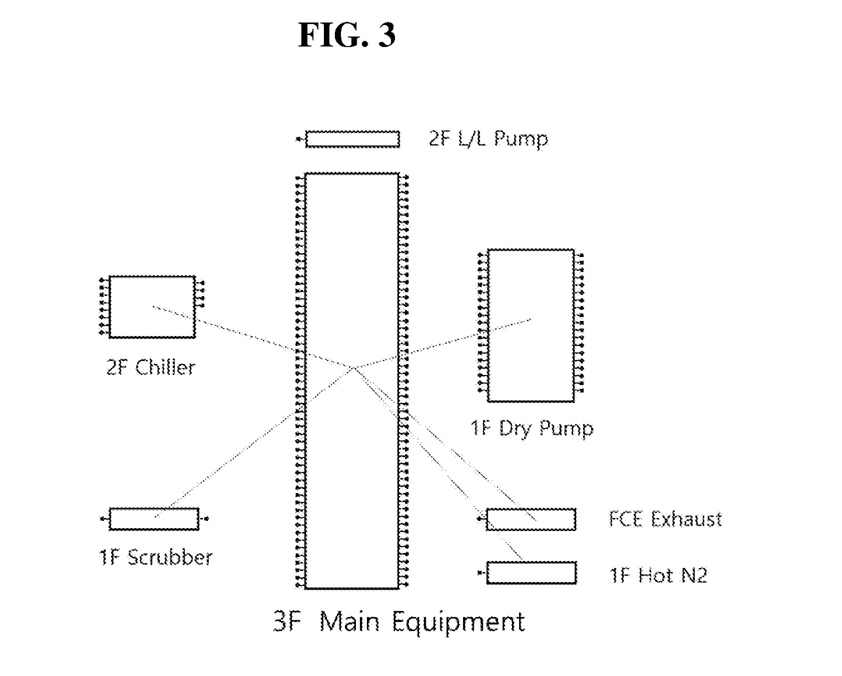
Figure 4:
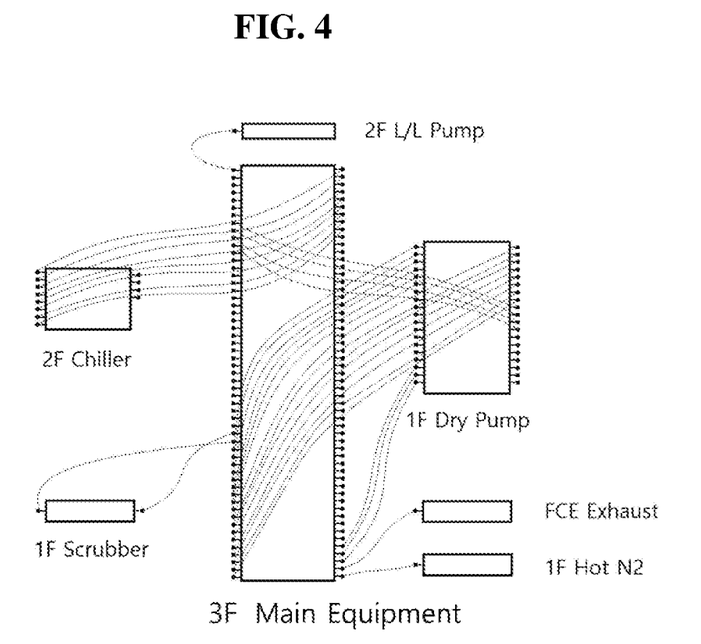

FIG. 1 is a flow chart for describing a machine learning-based automatic routing method for semiconductor equipment according to one embodiment of the present disclosure, and FIGS. 2 to 4 are views for describing the machine learning-based automatic routing method for semiconductor equipment according to one embodiment of the present disclosure.

Hereinafter, the machine learning-based automatic routing method for semiconductor equipment according to one embodiment of the present disclosure will be described with reference to FIGS. 1 to 4.

The machine learning-based automatic routing method for semiconductor equipment according to one embodiment of the present disclosure may be carried out by a machine learning-based automatic routing apparatus for semiconductor equipment, and more specifically, the machine learning-based automatic routing apparatus for semiconductor equipment may be configured as a computer apparatus, a server, or a dedicated automatic routing apparatus. More specifically, the machine learning-based automatic routing apparatus for semiconductor equipment may be configured as a computer apparatus, a server, or a dedicated automatic routing apparatus capable of performing machine learning for providing routing of semiconductor equipment.

First, according to one embodiment of the present disclosure, semiconductor equipment and ancillary equipment are disposed (S110).

In this case, according to one embodiment of the present disclosure, the semiconductor equipment refers to main equipment for manufacturing a semiconductor, and the ancillary equipment refers to a power box, a gas supply apparatus, an air conditioning apparatus, a temperature controller, a pump, a scrubber, a fixed chamber exhaust system (FCE), or a chiller.

The semiconductor equipment and the ancillary equipment configured in this way may be respectively disposed on floors. For example, a pump, a scrubber, and a hot N2 heater may be disposed on a first floor, a pump, a fixed chamber exhaust system (FCE), and a chiller may be disposed on a second floor, and main equipment may be disposed on a third floor.

There may be restrictions in the disposition relationship between the semiconductor equipment and the ancillary equipment. For example, the main equipment may be disposed on a different floor from other ancillary equipment. For example, the main equipment may be disposed on the third floor, and other ancillary equipment may be separated and disposed on the first and second floors.

As described above, the disposition of the semiconductor equipment and the ancillary equipment refers to a case in which the semiconductor equipment and the ancillary equipment are disposed through a simulation using the models, schematics, and data of the semiconductor equipment and the ancillary equipment in the machine learning-based automatic routing apparatus for semiconductor equipment.

Like the above, after the semiconductor equipment and the ancillary equipment are disposed, connection points (points of connection, POC) which are three-dimensional (3D) coordinates of the semiconductor equipment and the ancillary equipment are recognized (S120).

In this case, connection points (POC) of an input and an output of the semiconductor equipment and the ancillary equipment may be recognized. More specifically, connection properties of the connection points (POC) from the first floor to the third floor and connection properties of the connection points (POC) from the second floor to the third floor are recognized, and to this end, basic input data for piping line connection and disposition may be input.

Thereafter, an optimal path which connects the connection points (POC) using a machine learning algorithm is generated (S130).

More specifically, the optimal path may be generated by extracting the connectivity of the connection points (POC) and using an extraction result of a connection link based on the main equipment.

In this case, the optimal path which connects the connection points (POC) based on the semiconductor equipment using the machine learning algorithm may be generated, and more specifically, an optimal path which connects the connection points (POC) based on the semiconductor equipment using a Dijkstra algorithm may be generated.

The Dijkstra algorithm is an algorithm which calculates a path length to determine the shortest path, and may generate a more optimized path through reinforcement learning.

More specifically, according to one embodiment of the present disclosure, the semiconductor equipment and the ancillary equipment may be respectively disposed on the floors, and the connection points (POC) which are the 3D coordinates of the semiconductor equipment and the ancillary equipment respectively disposed on the floors may be recognized. Further, the optimal path which connects the connection points (POC) which are the 3D coordinates of the semiconductor equipment and the ancillary equipment respectively disposed at the sides using the machine learning algorithm may be generated.

Meanwhile, according to one embodiment of the present disclosure, the optimal path may be generated by maintaining a correlation between the connection points (POC) which are the 3D coordinates of the semiconductor equipment and the ancillary equipment respectively disposed at the sides using the machine learning algorithm even when the semiconductor equipment and the ancillary equipment are moved.

A processor may detect whether an intersection point is present by disposing connection elements on the generated optimal path (S140).

The connection elements may be pipes and lines. The processor may detect whether an intersection between the connection elements has occurred. The processor may detect whether an intersection has occurred based on cross-sectional diameters of the connection elements. The processor may detect whether an intersection has occurred based on cross-sectional diameters of connection elements stored in a memory, or detect whether an intersection has occurred based on cross-sectional diameters of connection elements received through a communication interface.

Alternatively, the processor may determine whether the connection elements intersect each other based on safe regions of the connection elements. That is, when two connection elements capable of intersecting are electrical pipes, a maximum diameter, which may be affected by electromagnetic waves, of each electrical pipe may be configured as the safe region, and when the safe regions of the two electrical pipes intersect, it may be determined that an intersection point is present. Alternatively, when one of the two connection elements capable of intersecting is an electrical pipe and the other one is a pipe without electromagnetic influence, whether the intersection point is present may be determined based on an actual diameter. As a result, when the two connection elements capable of intersecting are connection elements which may be affected by electromagnetic influence, whether the connection elements intersect may be determined based on the safe region, and when any one of the two connection elements is a connection element not affected by electromagnetic influence, whether the connection elements intersect may be determined by the actual diameter. Here, the safe region may be larger than the actual diameter.

The processor may generate and apply an avoidance path when the intersection point is detected (S150).

The processor may generate and apply an avoidance path to any one of the two connection elements when the intersection point between the connection elements is detected. The processor may generate and apply an avoidance path to a connection element having a low priority based on a priority of the intersecting connection elements.

The processor may generate an avoidance path based on the priority of the connection elements stored in the memory. When a floor direction is defined as a vertical direction and a direction horizontal to the floors is defined as a horizontal direction, the priority of the connection elements in the horizontal direction may be higher than the priority of the connection elements in the vertical direction.

Accordingly, when the intersection point between the connection element in the horizontal direction and the connection element in the vertical direction is detected, the avoidance path may be generated and applied to the connection element in the vertical direction. Even in the process of generating the avoidance path, the above-described process of operation S130 may be applied.

Whether the avoidance path is generated may also be determined based on the priority between the connection elements in the vertical direction. For example, an electrical pipe and a tray may have a higher priority than a utility pipe. Here, the utility pipe may be a water line, a gas pipe, or the like. The connection elements in the vertical direction may have the highest priority, and the connection element in the vertical direction may be, for example, a main duct pipe.

The processor may apply the connection element having the highest first priority based on the path derived by operation S130, may generate and apply the avoidance path of the connection element having a second priority when an intersection point between the connection element having the second priority and the connection element having the first priority is detected, and then may generate and apply the avoidance path based on disposition of the connection elements having the first and second priorities when intersection points between the connection element having a third priority and the connection elements having the first and second priorities are detected.

Accordingly, a disposition simulation of connection elements which avoid intersection with the diameters of the connection elements may be run.

Figure 5:
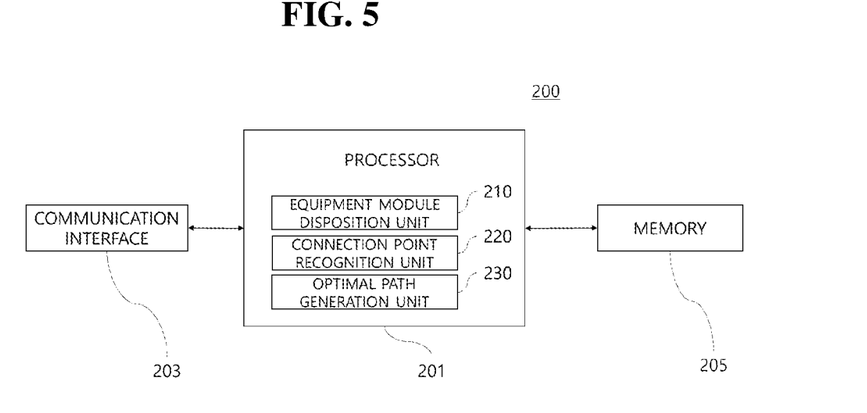
FIG. 5 is a block diagram of a machine learning-based automatic routing apparatus for semiconductor equipment according to one embodiment of the present disclosure.

FIG. 5 is a block diagram of the machine learning-based automatic routing apparatus for semiconductor equipment according to one embodiment of the present disclosure.

Hereinafter, a configuration of the machine learning-based automatic routing apparatus for semiconductor equipment according to one embodiment of the present disclosure will be described with reference to FIG. 5.

The machine learning-based automatic routing method for semiconductor equipment according to one embodiment of the present disclosure may be carried out by the machine learning-based automatic routing apparatus for semiconductor equipment, and more specifically, the machine learning-based automatic routing apparatus for semiconductor equipment may be configured as a computer apparatus, a server, or a dedicated automatic routing apparatus, and in this case, the machine learning-based automatic routing apparatus for semiconductor equipment may be may configured as a computer apparatus, a server, or a dedicated automatic routing apparatus capable of performing machine learning for providing routing of semiconductor equipment.

Referring to FIG. 5, a machine learning-based automatic routing apparatus 200 for semiconductor equipment according to one embodiment of the present disclosure may include a processor 201, a communication interface 203, and a memory 205. The processor 201 may include an equipment module disposition unit 210, a connection point recognition unit 220, and an optimal path generation unit 230.

Meanwhile, a function related to artificial intelligence according to the present disclosure is operated through the processor 201 and the memory 205. The processor 201 may be composed of one processor or a plurality of processors. In this case, one or more processors may be a general-purpose processor such as a central processing unit (CPU), an application processor (AP), a digital signal processor (DSP), or the like, a graphics-only processor such as a graphics processing unit (GPU), a vision processing unit (VPU), or an artificial intelligence-only processor such as a neural processing unit (NPU). The one processor or the plurality of processors control to process input data according to a predefined operation rule or artificial intelligence model stored in the memory 205. Alternatively, when the one or more processors are the artificial intelligence-only processors, the artificial intelligence-only processor may be designed in a hardware structure specialized for processing a specific artificial intelligence model.

The predefined operation rule or artificial intelligence model is made through learning. Here, a case in which the predefined operation rule or artificial intelligence model is made through learning means that a basic artificial intelligence model is learned using a plurality of pieces of learning data by a learning algorithm, and thus the predefined operation rule or artificial intelligence model which is set to perform a desired characteristic (or purpose) is made. Such learning may be performed in a device itself in which artificial intelligence according to the present disclosure is performed, or may be performed through a separate server and/or system. Examples of the learning algorithm may be supervised learning, unsupervised learning, semi-supervised learning, or reinforcement learning, but are not limited to the above-described examples.

The artificial intelligence model may be made through learning. The artificial intelligence model may be composed of a plurality of neural network layers. Each of the plurality of neural network layers has a plurality of weight values, and a neural network operation is performed through an operation between an operation result of a previous layer and the plurality of weight values. The plurality of weights of the plurality of neural network layers may be optimized by the learning result of the artificial intelligence model. For example, the plurality of weights may be updated so that a loss value or a cost value acquired from the artificial intelligence model during the learning process may be reduced or minimized.

The artificial neural network may include a deep neural network (DNN), for example, may include a convolutional neural network (CNN), the deep neural network (DNN), a recurrent neural network (RNN), a generative adversarial network (GAN), a restricted Boltzmann machine (RBM), a deep belief network (DBN), a bidirectional recurrent deep neural network (BRDNN), a deep Q-Network, or the like but is not limited to the above-described examples.

The processor 201 may dispose an equipment module based on information stored in the memory 205, recognize a connection point to generate an optimal path, and then output the optimal path through the communication interface 203. The processor 201 may process information received from the communication interface 203 to generate the optimal path, and then store the optimal path in the memory 205 and output the optimal path through the communication interface 203.

The equipment module disposition unit 210 may execute a disposition simulation of the semiconductor equipment and the ancillary equipment.

In this case, the semiconductor equipment may refer to main equipment for manufacturing a semiconductor, and the ancillary equipment may be a power box, a gas supply apparatus, an air conditioning apparatus, a temperature controller, a pump, a scrubber, a fixed chamber exhaust system (FCE), or a chiller.

The equipment module disposition unit 210 may respectively dispose the semiconductor equipment and the ancillary equipment on floors. For example, a pump, a scrubber, and a hot N2 heater may be disposed on a first floor, a pump, a fixed chamber exhaust system (FCE), and a chiller may be disposed on a second floor, and the main equipment may be disposed on a third floor.

As described above, the disposition of the semiconductor equipment and the ancillary equipment refers to a case in which the equipment module disposition unit 210 disposes the semiconductor equipment and the ancillary equipment through the simulation using models, schematics, and data of the semiconductor equipment and the ancillary equipment.

The connection point recognition unit 220 recognizes connection points (POC) which are the 3D coordinates of the semiconductor equipment and the ancillary equipment.

In this case, the connection point recognition unit 220 may recognize the connection points (POC) of an input and an output of the semiconductor equipment and the ancillary equipment. More specifically, the connection properties of the connection points (POC) from the first floor to the third floor and the connection properties of the connection points (POC) from the second floor to the third floor are recognized, and to this end, basic input data for piping line connection and disposition may be input.

The optimal path generation unit 230 generates an optimal path which connects the connection points (POC) using a machine learning algorithm.

More specifically, the optimal path generation unit 230 may generate the optimal path by extracting the connectivity of the connection points (POC) and using the extraction result of the connection link based on the main equipment.

In this case, the optimal path generation unit 230 may generate an optimal path which connects the connection points (POC) based on the semiconductor equipment using the machine learning algorithm, and more specifically, may generate an optimal path which connects the connection points (POC) based on the semiconductor equipment using a Dijkstra algorithm.

The Dijkstra algorithm is an algorithm which calculates a path length to determine the shortest path, and may generate a more optimized path through reinforcement learning.

As such, according to one embodiment of the present disclosure, the equipment module disposition unit 210 may respectively dispose the semiconductor equipment and the ancillary equipment on floors, and the connection point recognition unit 220 may recognize the connection points (POC) which are the 3D coordinates of the semiconductor equipment and the ancillary equipment respectively disposed on the floors. Further, the optimal path generation unit 230 may generate an optimal path which connects the connection points (POC) which are the 3D coordinates of the semiconductor equipment and the ancillary equipment respectively disposed at the sides using the machine learning algorithm.

Meanwhile, according to one embodiment of the present disclosure, the optimal path generation unit 230 may generate an optimal path by maintaining a correlation between the connection points (POC) which are the 3D coordinates of the semiconductor equipment and the ancillary equipment respectively disposed at the sides using the machine learning algorithm even when the semiconductor equipment and the ancillary equipment are moved.

Thereafter, the processor 201 may detect whether an intersection point is present, and when the intersection point is present, the processor 201 may generate and apply an avoidance path of the connection elements having a low priority based on the priority between the connection elements stored in the memory 205.

Like the above, according to the present disclosure, the 3D connection points (POC) between the semiconductor equipment and the ancillary equipment may be defined, and the semiconductor equipment and the ancillary equipment may be connected based on the machine learning algorithm using this data to reduce costs of building materials and significantly shorten a building construction time by accurately calculating lengths of materials such as wiring, pipes, and the like.

The above-described various embodiments may be implemented in a recording medium which is readable by a computer or a similar apparatus using software, hardware, or a combination thereof. In some cases, the embodiments described in the specification may be implemented by the processor itself. When the embodiments are implemented as software, embodiments such as procedures and functions described in the specification may be implemented as separate software modules. Each of the software modules may perform one or more functions and running described in the specification.

Computer instructions for performing processing operations according to the above-described various embodiments of the present disclosure may be stored in a non-transitory computer-readable medium. The computer instructions stored in this non-transitory computer-readable medium may allow a specific device to perform the processing operations according to the above-described various embodiments when executed by a processor.

The non-transitory computer-readable medium refers to a medium which semi-permanently stores data, and is readable by a device, not a medium which stores data for a short moment such as a register, a cache, a memory, or the like. Specific examples of the non-transitory computer-readable medium may be a compact disc (CD), a digital video disk (DVD), a hard disk, a Blu-ray disk, a universal serial bus (USB), a memory card, a read-only memory (ROM), and the like.

A device-readable storage medium may be provided in a form of a non-transitory storage medium. Here, 'the non-transitory storage medium' is a tangible apparatus and only means that a signal (for example, electromagnetic wave) is not included, and this term does not distinguish a case in which data is semi-permanently stored in the storage medium and a case in which data is temporarily stored in the storage medium. For example, 'the non-transitory storage medium' may include a buffer in which the data is temporarily stored.

Methods according to the various embodiments disclosed in this document may be included in a computer program product to be provided. The computer program product may be traded between a seller and a buyer as a product. The computer program product may be distributed in a form of a device-readable storage medium (for example, compact disc read only memory (CD-ROM)), or may be distributed (for example, downloaded or uploaded) directly or online through an application store (for example, Play Store™) or on two user devices (for example, smartphones). In the case of online distribution, at least a portion of the computer program product (for example, a downloadable app) may be at least transitorily stored in a machine-readable storage medium, such as a memory of a manufacturer's server, a server of an application store, or a relay server, or temporarily created.

According to a machine learning-based automatic routing method and apparatus for semiconductor equipment of the present disclosure, 3D connection points (POC) between semiconductor equipment and ancillary equipment can be defined, and the semiconductor equipment and the ancillary equipment can be connected based on a machine learning algorithm using this data to reduce the costs of building materials and significantly shorten a building construction time by accurately calculating the lengths of materials such as wiring, pipes, and the like.

Although preferable embodiments of the present disclosure have been described above, the present disclosure is not limited to the above-described specific embodiments, various modifications are possible by those skilled in the art without departing from the principle of the present disclosure claimed in the claims, and these modifications should not be individually understood from the technical spirit or prospect of the present disclosure.

What is claimed is:

1. A machine learning-based automatic routing method for semiconductor equipment using a machine learning-based automatic routing apparatus for semiconductor equipment, the method comprising:
- a first operation of disposing semiconductor equipment and ancillary equipment respectively on floors;
- a second operation of recognizing connection points (points of connection, POC) which are three-dimensional (3D) coordinates of the semiconductor equipment and the ancillary equipment respectively disposed on the floors; and
- a third operation of generating an optimal path which connects the connection points (POC) which are the 3D coordinates of the semiconductor equipment and the ancillary equipment respectively disposed at the sides using a machine learning algorithm.

2. The method of claim 1, wherein connection points of an input and an output of the semiconductor equipment and the ancillary equipment are recognized in the second operation.

3. The method of claim 1, wherein an optimal path which connects the connection points (POC) based on the semiconductor equipment using the machine learning algorithm is generated in the third operation.

4. The method of claim 3, wherein an optimal path which connects the connection points (POC) based on the semiconductor equipment using a Dijkstra algorithm is generated in the third operation.

5. The method of claim 1, wherein an optimal path is generated by maintaining a correlation between the connection points (POC) which are the 3D coordinates of the semiconductor equipment and the ancillary equipment respectively disposed at the sides using the machine learning algorithm when the semiconductor equipment and the ancillary equipment are moved in the third operation.

6. A machine learning-based automatic routing apparatus for semiconductor equipment, comprising:
- an equipment module disposition unit configured to dispose semiconductor equipment and ancillary equipment respectively on floors;
- a connection point recognition unit configured to recognize connection points (POC) which are 3D coordinates of the semiconductor equipment and the ancillary equipment respectively disposed on the floors; and
- an optimal path generation unit configured to generate an optimal path which connects the connection points (POC) which are the 3D coordinates of the semiconductor equipment and the ancillary equipment respectively disposed at the sides using a machine learning algorithm.

7. The apparatus of claim 6, wherein the connection point recognition unit recognizes connection points of an input and an output of the semiconductor equipment and the ancillary equipment, and
the optimal path generation unit generates an optimal path which connects the connection points (POC) based on the semiconductor equipment using a Dijkstra algorithm.

* * * * *